US006443620B1

(12) United States Patent
Chiu et al.

(10) Patent No.: US 6,443,620 B1
(45) Date of Patent: Sep. 3, 2002

(54) LINEAR RAIL BAR WITH SPACERS

(75) Inventors: Yueh-Ling Chiu; Paul Yang, both of Taichung County (TW)

(73) Assignee: Hiwin Technologies Corp. (TW)

( * ) Notice: Subject to any disclaimer, the term of this patent is extended or adjusted under 35 U.S.C. 154(b) by 0 days.

(21) Appl. No.: 09/663,139

(22) Filed: Sep. 15, 2000

(30) Foreign Application Priority Data

Mar. 3, 2000 (TW) .......................................... 89103757 A

(51) Int. Cl.[7] .............................................. F16C 33/38
(52) U.S. Cl. ............................................ 384/45; 384/51
(58) Field of Search ............................... 384/51, 43, 45, 384/520, 49

(56) References Cited

U.S. PATENT DOCUMENTS

| 1,405,894 | A | * | 2/1922 | Borg ........................... 384/520 |
| 3,208,806 | A | * | 9/1965 | Grolmann et al. .......... 384/520 |
| 4,175,805 | A | * | 11/1979 | Becker et al. ............... 384/520 |
| 5,615,955 | A | * | 4/1997 | Namimatsu et al. .......... 384/45 |
| 5,927,858 | A | * | 7/1999 | Agari ........................... 384/51 |
| 6,113,274 | A | * | 9/2000 | Horimoto ..................... 384/43 |
| 6,149,307 | A | * | 11/2000 | Kamimura et al. ........... 384/49 |
| 6,176,149 | B1 | * | 1/2001 | Misu ........................... 74/521 |

* cited by examiner

Primary Examiner—Thomas R. Hannon
(74) Attorney, Agent, or Firm—Bacon & Thomas, PLLC

(57) ABSTRACT

A spacer is interposed between two adjacent balls and is formed into an elaborately designed cylinder-like configuration which is able to minimize noise and frictional loss due to mutual collision and impact of the balls. A lubrication let through hole is provided therein to further improve lubrication and cooling effects.

7 Claims, 4 Drawing Sheets

LINEAR RAIL BAR WITH SPACERS

BACKGROUND OF THE INVENTION

1. Field of the Invention

The present invention relates to a linear rail bar, and more particularly, a linear rail bar whose two adjacent balls are separated by a spacer so as to prevent colliding and impacting each other thereby minimizing noise produced by the linear rail bar.

2. Description of the Prior Art

A well-known conventional linear rail bar is formed of a long infinitely extendable bar and a slider unit. The slider unit includes a slider body, two end caps for turning moving direction of rolling balls and other accessories. Both rail bar and the slider body are formed of grooves on their surface for a plurality of balls to roll therein, and a returning passage is provided in the slider body for recycling of the balls. This returning passage and the turning passage in the two end caps form a load free passage of the balls; while the grooves of both rail bar and slider body are combine to form a loaded passage of the balls. The load free passage and the loaded passage combine to construct a recycling passage which allows a predetermined amount of balls to make an infinitely recycling motion therein. With the aid of rolling balls, the slider is able to move along the rail bar less frictionally.

The track of the linear rail bar in the loaded passage is approximately a straight line, and change of moving direction of balls in the turning passage is quite large. The irregular change of moving speed of individual balls produced when they are passing along the track of varying curvature causes collision and impact between adjacent balls. Such collision and impact bring about particularly serious noise and vibration of the linear rail bar in the case those balls are made of metallic material. Besides, frictional contact between two adjacent balls moving in different direction may cause the above-mentioned noise and vibration more intensified. Although there have been developed some preferable materials, (for example, ceramic) which can be employed to fabricate balls with advantages of light weight, low impact energy, better hardness, anti-abrasion and better damping characteristic, yet they are considerably expensive which limits them to be usable only for linear rail bars in special application field and not widely applicable generally.

For solving the problem of mutual collision and impact of balls in the turning passage under the end caps, a method is suggested by U.S. Pat. No. 4,505,522 in which accommodative amount of balls is reduced in the turning passage so as to alleviate the change of amount of balls thereof. Meanwhile, in order to realized such an object, the geometrical figure of the turning passage has to be formed so precisely that resulting in complicating fabrication of a linear rail bar.

A remedy for improving mutual collision and impact of balls in the loaded passage of a linear rail bar is shown in FIG. 7. As shown in FIG. 7, a plurality of balls 4 are rolling in grooves 11 of a rail bar and grooves 21 of a slider body. A smaller spacer ball 6 is interposed between two adjacent balls 4, the rotating direction of the spacer ball 6 is in reverse that of the two adjacent balls 4 so that rotation at the contact surface of two balls 4 and 6 is the same thereby reducing frictional resistance between the balls 4 and improving mobility of the linear rail bar. Generally, the ball 4 and the spacer ball 6 are made of the same material. Although, by such means the exacerbated frictional resistance arising from the contact surface due to two adjacent balls 4 rotating in different direction in the loaded passage can be eliminated, yet there still remains no answer to the problem as to mutual collision and impact of balls 4 moving along in the turning passage due to change of speed.

The U.S. Pat. No. 5,615,955 suggested use of oil immersed plastic spacer balls 6 in those shown in FIG. 7 to exhibit both anti-vibration property of plastic material and lubrication effect. Such a system improves better flexibility due to deformation and reduces noise of impact, however, the advantages above are counteracted by the lowering of mechanical strength of the linear rail bar because due to the occupation of room in the loaded passage by the spacers 6 whose sizes nearly equal that of the ball 4, thus reducing the amount of ball 4 to accommodate the loaded passage to almost half of original value.

SUMMARY OF THE INVENTION

The present invention has been made in order to eliminate the inconvenience inherent to the conventional techniques as mentioned above. One object of the present invention is to provide a linear rail bar having a spacer between two adjacent balls for reducing noise and vibration arising from mutual collision and impact between adjacent balls.

It is another object of the present invention to provide a linear rail bar having a spacer between two adjacent balls, and the spacer is made as small as possible not to occupy two much spacing to make room for more balls in a loaded passage so as to enhance strength of the linear rail bar.

It is still another object of the present invention to provide a linear rail bar having a spacer made of oil containing plastic material and provided with lubricant path so as to lower the friction of the linear rail bar.

In keeping with an aspect of the present invention, this and other objects mentioned above are accomplished by providing an anti-noise and anti-vibration spacer between adjacent balls, formed in a cylindrical shape with both end surfaces thereof formed into an inwardly concaved surface so as to match the shape of the ball thereby greatly reducing the space required for the spacer that in turn increasing accommodative amount of balls in the loaded passage and enhancing the mechanical strength of the present invention.

In the present invention, for preventing the unrolling cylindrical spacer from increasing contact friction between the passage walls, the outer diameter of the cylinder is made smaller than that of the ball.

In the present invention, for preventing the spacer from contacting the side wall surfaces of abruptly curved turning passage, and even producing a normal pressure to the wall surfaces so as to exacerbate the increase of frictional resistance, the spacer is divided into two butt jointed truncated cone shaped bodies with the diameter at the middle portion thereof smaller than that at the two ends so as to make contact surface with the passage as less as possible.

For preventing earlier breakage of an oil film on the ball surface, the contact area between the ball and the spacer shall be kept as small as possible. The inward concavity at the end surface of the spacer is formed of two conical arcuate surfaces as it is observed from the front, and the radius thereof is slightly larger than that of the ball so that the contact surface between the ball and the spacer can be minimized as small as approaching to a point.

In the present invention, for improving lubricating effect of the spacer, a let through hole is provide therein so as to accept the lubricant oil exuded from the oil film on the ball in contact and impart this oil to the next ball thereby accomplishing lubrication effect and cooling effect as well.

In the present invention, for eliminating the disadvantage that the lubricating oil can not pass smoothly through the closed contact surface between the ball and the spacer, and instead, passing via the let through hole, the inwardly concaved surface of the spacer is formed into a sinuate shape so as to divide the contact surface between the ball and the spacer into a plurality of intermittent contact points thereby improving the flow of lubricating oil and lowering frictional resistance as well.

In the present invention, materials for example, plastics, high molecular compounds, reinforced plastics, and ceramic are usable for fabricating low friction and anti-abrasive spacer.

Besides, oil containing materials are recommendable for fabricating the spacer so as to save consuming lubrication oil in a linear rail bar.

BRIEF DESCRIPTION OF THE DRAWINGS

The accompanying drawing, which are included to provide a fuller understanding of the invention and incorporated in and constitute a part of this specification, illustrate embodiments of the invention and together with the description serve to explain the principles he invention, wherein.

DETAILED DESCRIPTION OF THE PREFERRED EMBODIMENT

Figure 1:
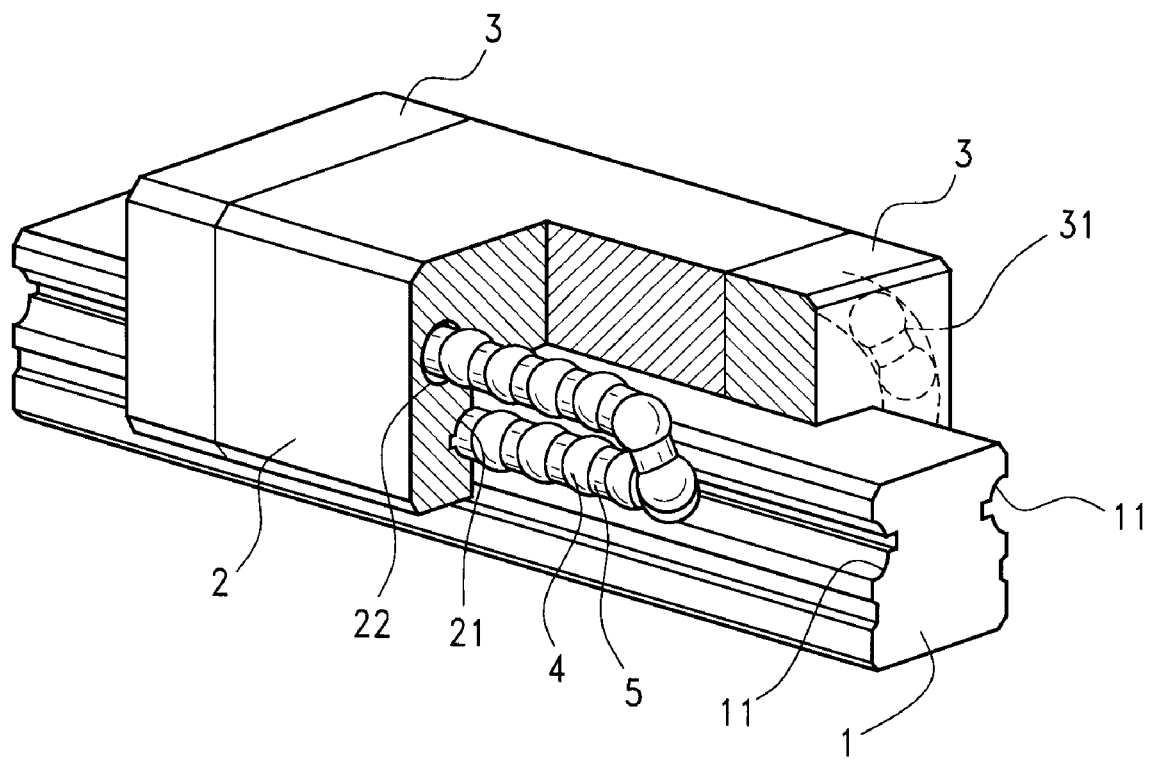
FIG. 1 is a cross-sectional view of the spacer for a linear rail bar of the present invention.

FIG. 1 is a drawing of a linear rail bar according to the present, invention, as shown in FIG. 1, a linear rail bar comprises a track 1, a slider body 2, and two end caps 3. There are grooves 11 formed o n the outer surface of the track 1, while grooves 21 corresponding to the former grooves 11 are formed on the slider body 2, and a returning passage 22 for balls 4 and spacers 5 is also formed on the slide r body 2. The returning passage 22 and a turning passage 31 in the two end caps 3 form a load free passage for the balls, and the grooves 11 on the track 1 and the grooves 21 on the slider body 2 form a loaded passage of the balls. The two passages mentioned above constitute a recycling passage for a plurality of balls 4 and the spacers 5 to continuously move along when the slider body 2 moves along the track 1. The spacer 5 is interposed between two adjacent balls 4 so as to evade collision and impact between the two balls 4. The balls 4 rotate in the passages, while the spacers 5 do not rotate.

Figure 2:
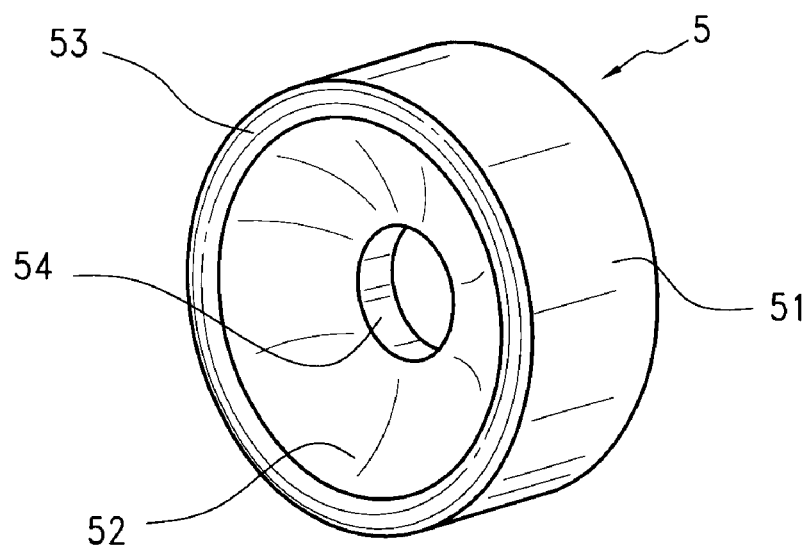
FIG. 2 is a three dimensional view of the spacer shown in FIG. 1.
Figure 3:
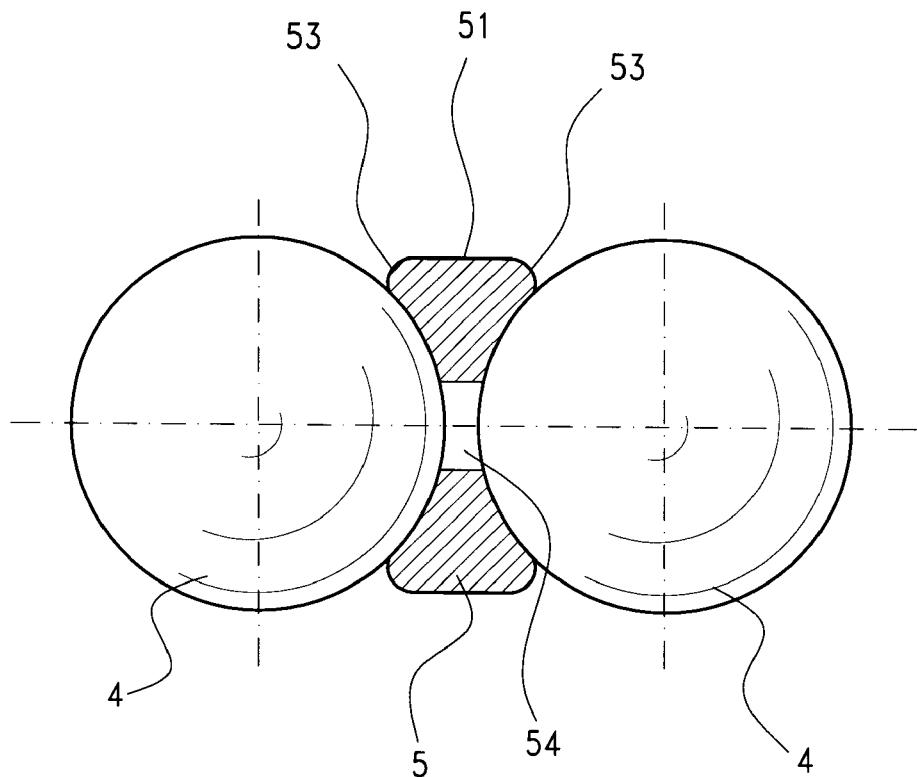
FIG. 3 is a sectional view of a spacer and a ball.

FIG. 2 is a three dimensional view of the spacer shown in FIG. 1, and FIG. 3 is a cross-sectional view of a spacer and a ball. The spacer 5 is formed into a cylindrical body having a side surface 51 and two inwardly concaved surface 52 at both ends, the contact edges of the cylindrical side surface 51 and the inwardly concaved surfaces 52 are beveled with bevel angles 53. A let through hole 54 is formed through the spacer 5 to let out excessive lubrication oil that can exude from oil film on the ball 4 and to transfer by and impart the excess oil to other balls 4 that may lack oil so that all of the balls 4 may be lubricated uniformly. The existence of the let through hole 54 in the spacer 5 can attain a dual purpose for lubrication and cooling the linear rail bar.

Figure 4:
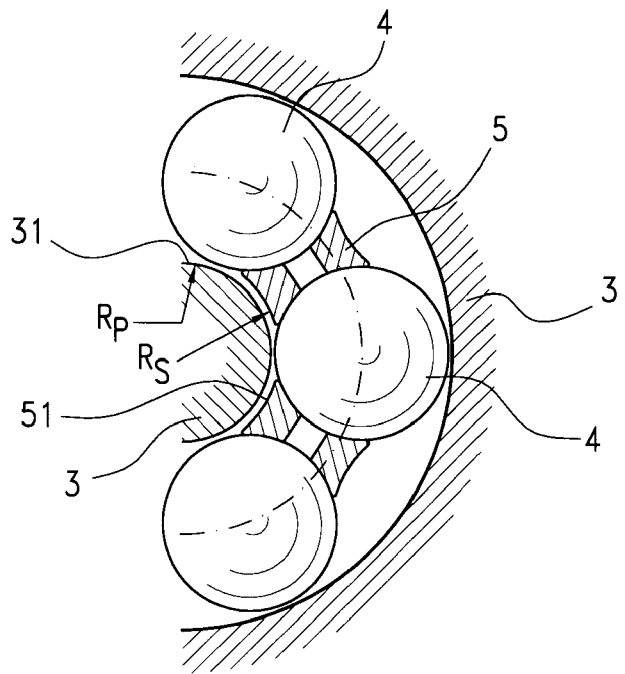
FIG. 4 i sa view showing a spacer is coming to the turning passage of the linear rail bar of the present invention.

FIG. 4 is a drawing showing a spacer in the turning passage of the linear rail bar. Since the turning passage 31 is formed in an arcuate shape with a small curvature, the spacer 5 is forced to closely approach the inner side of the turning passage 31, when it is passed along the turning passage 31 with the balls 4. In this situation, the spacer 5 which is in contact with the walls of the passage 31 will urge a normal pressure thereon due to the insufficient room allowable for turning. This normal pressure to the wall surface of the passage 31 increases frictional resistance to the liner rail bar. To eliminate such a disadvantage, the cylindrical side surface 51 of the spacer 5 is formed into two truncated conical surfaces. As shown in FIG. 4, the minimum radius of curvature of the wall of the turning passage 31 is Rp, whereas the radius of the conical surface 51 at the middle portion is Rs which is preferably not larger than Rp.

Figure 5:
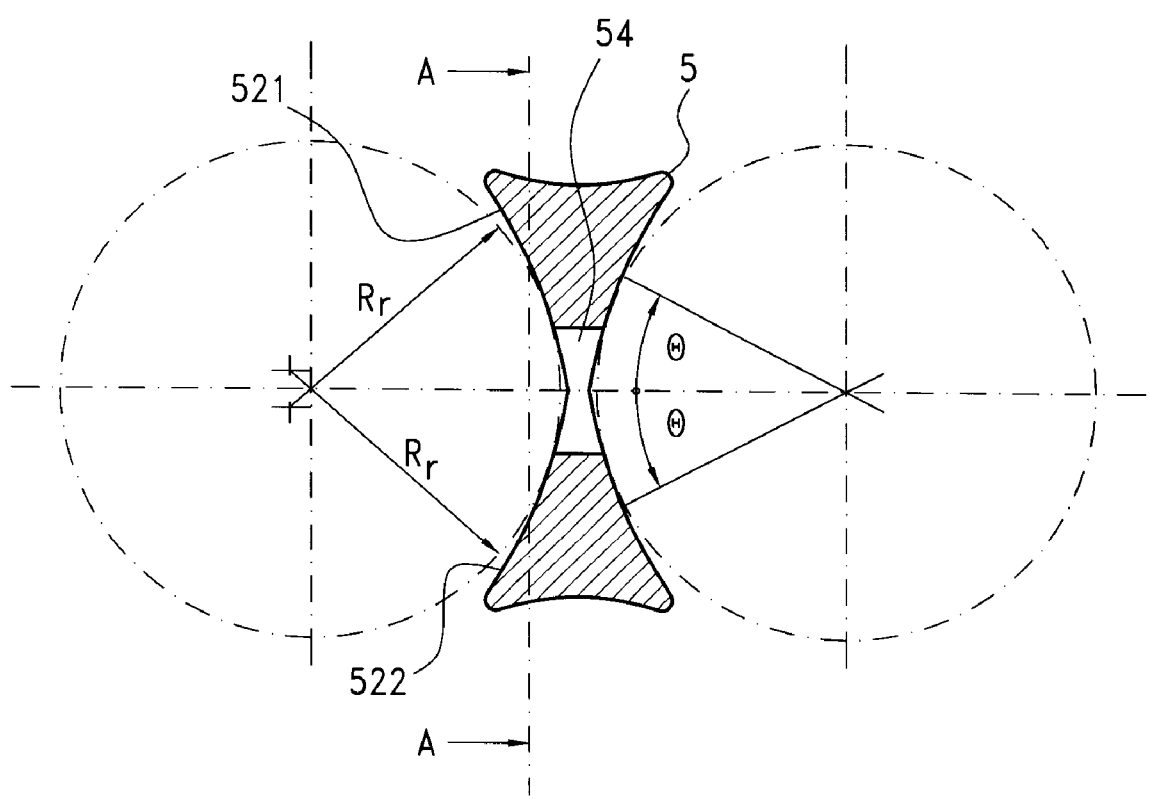
FIG. 5 is a schematic view of the spacer in another embodiment of the present invention.

In order to minimize the contact area between the ball and the spacer so as to protect the oil film formed on the ball surface, an improvement is made as shown in FIG. 5. In this embodiment, the inwardly concaved surface 52 of the spacer 5 is formed into two inwardly concaved conical arcuate surfaces 521, 522 of the same radius which are slightly larger than radius of the ball 4 so that the contact between the ball 4 and the surfaces 521, 522 become contact points. It was discovered that when the ratio of radius Rr of arcuate surfaces 521, 522 to the diameter of the ball is at the range 0.5~0.8, a satisfactory result is obtained. Moreover, the angle formed between the contact point and the center line is preferably in the range 20°–40°.

Figure 6:
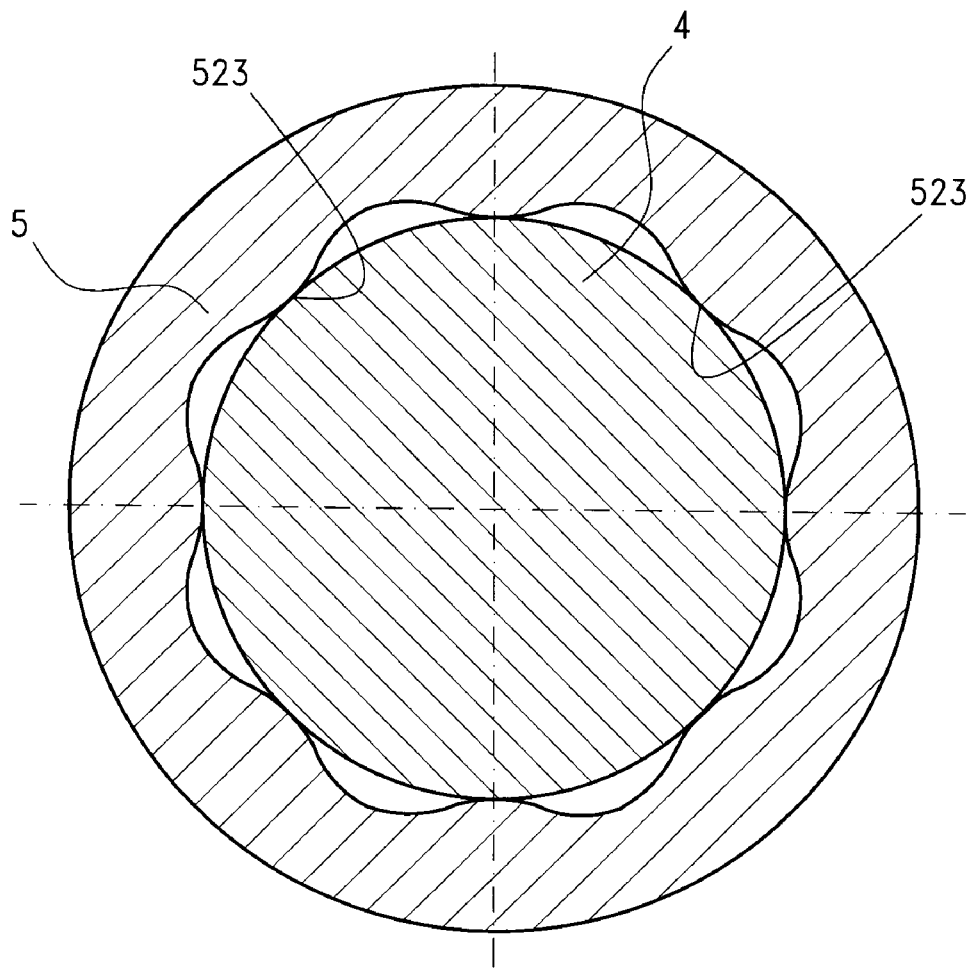
FIG. 6 is a cross-sectional view of FIG. 5 cut along line A—A.
Figure 7:
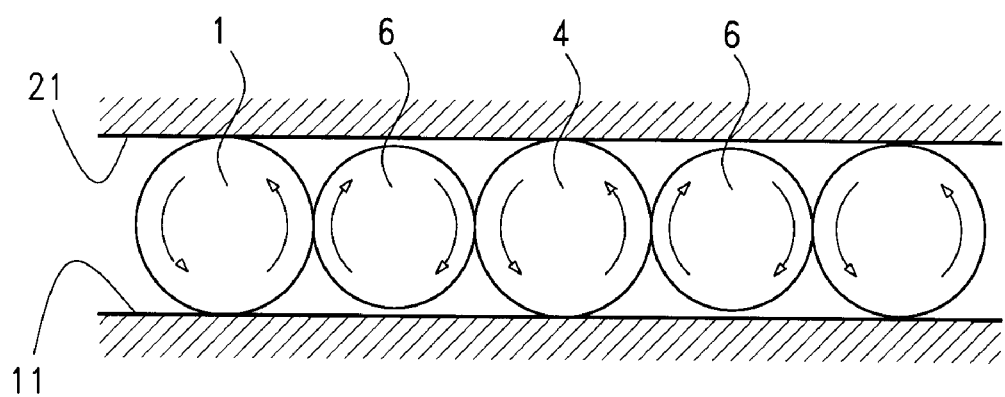
FIG. 7 is a drawing showing conventional means for improved structure of balls in the loaded passage of a linear rail bar to reduce mutual collision and impact.

FIG. 6 is a view similar to a cross-sectional view of FIG. 5 cut along line A—A. To eliminate the disadvantage that the lubricating oil can not pass smoothly through the closed contact surface between the ball 4 and the spacer 5, and instead, pass via the let through hole, the inwardly concaved surface 52 of the spacer 5 of this embodiment is formed into a sinuate shaped stripes 523 so as to divide the contact surface mentioned above into a plurality of intermittent contact points, thereby improving the flow of lubricating oil and lowering frictional resistance.

Those who are skilled in the art will readily perceive how to modify the invention. Therefore, the appended claims are to be constructed to cover all equivalent structures which fall within the true scope and spirit of the invention.

What is claimed is:

1. A linear-rail bar with spacers, said rail bar comprising:
    a track;
    a slider unit;
    a plurality of balls circulating between said track and said slider unit with a plurality of spacers of equal thickness and each interposed between two adjacent ones of said balls;
    said track comprises a rectangular shape having first grooves formed along surface thereof for said balls to roll there along;
    said slider unit includes a slider body and two end caps adapted for turning the moving direction of said balls, and second grooves corresponding to said first grooves are formed on said track along an inner surface of said slider body;

said balls are accommodated between the first and second grooves of said track and said slider body, while said spacers are interposed between every adjacent ones of said balls;

said balls comprise sphere balls of metallic material;

said spacers comprise a cylindrical form comprising two truncated cone butts jointed with each other so that the diameter of a middle portion thereof is smaller than that at both ends thereof, and the diameter at both ends is smaller than that of said balls, and both ends are formed into inwardly concaved surfaces adapted for contacting said balls;

a through hole extending through the inwardly concaved surfaces of each of the spacers; and wherein the minimum radius of curvature of a turning passage between the slider unit and the track is not smaller than that of the arcuate surface at the middle portion of said spacer.

2. The linear rail bar with spacers of claim 1, wherein each said inwardly concaved surface of said spacer has a let through hole at its center thereof.

3. The linear rail bar with spacers of claim 1, wherein the inwardly concaved surface formed at each end of said spacers comprises of two intersected spherical surfaces.

4. The linear rail bar with spacers of claim 3, wherein the radius of curvature of said two intersected spherical surfaces is 0.5~0.8 times the radius of said ball.

5. The linear rail bar with spacers of claim 1, wherein each inwardly concaved surface of said spacer comprises sinuate shaped stripes.

6. The linear rail bar with spacers of claim 1, wherein said spacer is comprised of low friction and anti-abrasive materials selected from the group consisting of plastics, high molecular compounds, reinforced plastics and ceramic.

7. The linear rail bar with spacers of claim 6, wherein the materials for said spacer further comprises oil.

* * * * *